3,264,324
PHOSPHONITES
Henry Gould, West Orange, N.J., and Lester Friedman, Whitestone, N.Y., assignors, by mesne assignments, to Union Carbide Corporation, a corporation of New York
No Drawing. Filed Sept. 15, 1960, Ser. No. 56,118
15 Claims. (Cl. 260—347.8)

This invention relates to the preparation of phosphonites.

It is an object of the present invention to develop an improved process for preparing phosphonites.

Another object is to prepare such phosphonites having improved physical properties and particularly having improved purity.

A further object is to prepare novel phosphonites.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by transesterifying a phosphonite having the formula $$R_1P\begin{matrix}OR_2\\OR_3\end{matrix}$$

where $R_1$, $R_2$ and $R_3$ are aryl or haloaryl with a mono or polyhydric alcohol in the presence of a phosphite having the formula $$\begin{matrix}R_4O\\R_5O\end{matrix}P-OH$$

where $R_4$ and $R_5$ and hydrocarbon or halohydrocarbon as a catalyst. The catalyst is preferably used in an amount of 0.1 to 1% of the starting phosphonite by weight although smaller or larger amounts of catalyst can be used.

Preferably the mono or polyhydric alcohol has a boiling point above that of the phenol liberated in the transesterification. The transesterification also is preferably carried out at reduced pressure, e.g. 0.1–100 mm. and preferably 10–20 mm. while distilling to remove the phenol formed, although atmosphere or superatmospheric pressure can be employed.

The starting phosphonites can be formed in conventional fashion as illustrated by the following equations:

 + Cl$_3$ ⟶ 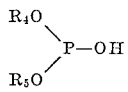PCl$_2$ + HCl

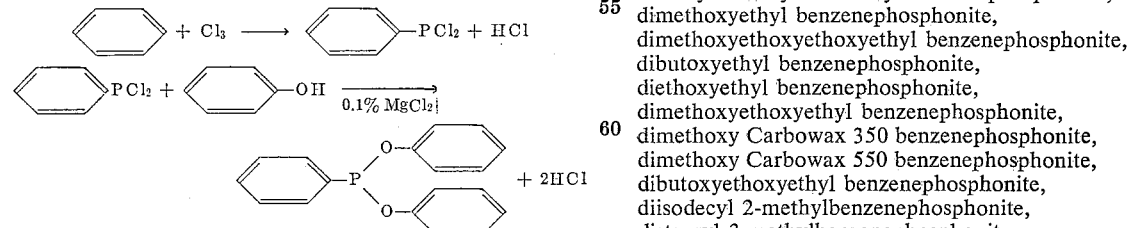

As starting phosphonites there can be used diphenylbenzenephosphonite,
di-o-cresyl benzenephosphonite,
di-p-cresyl benzenephosphonite,
di-m-cresyl benzenephosphonite,
phenyl p-cresyl benzenephosphonite,
di-2,4-dimethylphenyl benzenephosphonite,
di-2-chlorophenyl benzenephosphonite,
di-phenyl 2-methylbenzenephosphonite,
diphenyl-2,4,-dimethylbenzenephosphonite,
diphenyl-3-methylbenzenephosphonite,
diphenyl-4-methylbenzenephosphonite,
di-o-cresyl-3-methylbenzenephosphonite,
p-chlorophenyl 2-chlorobenzenephosphonite.

The preferred starting phosphonite is diphenyl benzenephosphonite.

As the alcohol there can be used alkanols, e.g. methyl alcohol, n-octanol, n-decyl alcohol, isodecyl alcohol (a mixture of isomeric decyl alcohols prepared by the oxo process), lauryl alcohol, cetyl alcohol, octadecyl alcohol (stearyl alcohol), cyclohexanol, 1,2-alkanediols and 1,3-alkanediols, e.g. ethylene glycol, propylene glycol, trimethylene glycol 1,2-butylene glycol, 2,3-butyleneglycol, pinacol, 1,2-pentanediol, 2-methyl-2,4-pentanediol (hexylene glycol), 1,3-butylene glycol, neopentyl glycol (2,2-dimethyl-1,3-propanediol), neohexylene glycol (2-methyl-2-ethyl-1,3-propanediol), 2-ethyl-1,3-hexanediol, 2,4-pentanediol, 2,4-heptanediol, 2,2-diethyl-1,3-propanediol, 2-ethyl-2-n-butyl-1,3-propanediol, heterocyclic alcohols such as tetrahydrofurfuryl alcohol, pentaerythritol, glycol mono ethers such as methoxyethanol, methoxyethoxyethoxyethanol (methoxytriglycol) butoxyethanol, ethoxyethanol, methoxyethoxyethanol, phenoxyethanol, methoxy Carbowax 350 (methyl ether of polyethylene glycol having a molecular weight of 338, methoxy Carbowax 550 (methyl ether of polyethylene glycol having a molecular weight of 538), butyl Carbitol (butoxyethoxyethanol).

For the catalyst there can be employed phosphites such as diphenyl phosphite, didecyl phosphite, phenyl decyl phosphite, di-isodecyl phosphite, di-o-cresyl phosphite, di-p-cresyl phosphite, di-m-cresyl phosphite, di-2,4-dimethylphenyl phosphite, distearyl phosphite, dilauryl phosphite, dibutyl phosphite, di-2-chlorophenyl phosphite.

The phosphonite, e.g. diphenyl benzene phosphonite can be reacted with one or two mols of the monohydric alcohol to replace either one or two of the phenoxy groups with the alcohol groups. Typical examples of compounds which can be made according to the invention are didecyl benzenephosphonite,
di-isodecyl benzenephosphonite,
phenyl decyl benzenephosphonite,
dilauryl benzenephosphonite,
distearyl benzenephosphonite,
dimethyl benzenephosphonite,
diphenoxyethyl benzenephosphonite,
dietetrahydrofurfuryl benzenephosphonite,
phenyl tetrahydrofurfuryl benzenephosphonite,
isodecyl tetrahydrofurfuryl benzenephosphonite,
dimethoxyethyl benzenephosphonite,
dimethoxyethoxyethoxyethyl benzenephosphonite,
dibutoxyethyl benzenephosphonite,
diethoxyethyl benzenephosphonite,
dimethoxyethoxyethyl benzenephosphonite,
dimethoxy Carbowax 350 benzenephosphonite,
dimethoxy Carbowax 550 benzenephosphonite,
dibutoxyethoxyethyl benzenephosphonite,
diisodecyl 2-methylbenzenephosphonite,
distearyl 3-methylbenzenephosphonite,
dilauryl 4-methylbenzenephosphonite,
diisodecyl 3-chlorobenzenephosphonite,
phenyl lauryl benzenephosphonite,
phenyl stearyl benzenephosphonite.

These compounds wherein the alkyl group has 10 to 18 carbon atoms of where there is one or more ether groups present are new compounds.

Two mols of the starting aromatic phosphonite can be reacted with one mol of pentaerythritol in the presence of the phosphite catalyst and form new compounds having the formula:

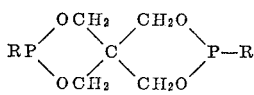

where R is an aryl or haloaryl group. Examples of such compounds are 3,9-diphenyl-2,4,8,10-tetraoxa-3,9-diphosphaspiro-[5,5] undecane,
3,9-di-2'-methylphenyl-2,4,8,10-tetraoxa-3,9-diphosphaspiro-[5,5] undecane,
3,9-di-4'-methylphenyl-2,4,8,10-tetraoxa-3,9-diphosphaspiro-[5,5] undecane,
3,9-di-3'-methylphenyl-2,4,8,10-tetraoxa-3,9-diphosphaspiro-[5,5] undecane,
3,9-di-4'-chlorophenyl-2,4,8,10-tetraoxa-3,9-diphosphaspiro-[5,5] undecane.

By reacting one mole of the aromatic phosphonite with one mol of a 1,2-glycol or 1,3-glycol there are prepared compounds having the formula:

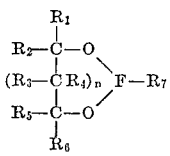

where $R_1$, $R_2$, $R_3$, $R_4$, $R_5$ and $R_6$ are hydrogen or lower alkyl, $n$ is 0 or 1 and $R_7$ is aryl or haloaryl. Preferably $n$ is 1 and $R_7$ is phenyl.

Example of such compounds are ethylene benzene phosphonite

[2-phenyl-1,3,2-dioxaphospholane],
2-phenyl-4-methyl-1,3,2-dioxaphospholane,
2-phenyl-4,4,5,5-tetramethyl-1,3,2-dioxaphospholane,
2-phenyl-4,5-dimethyl-1,3,2-dioxaphospholane,
2-phenyl-4-ethyl-1,3,2-dioxaphospholane,
2-phenyl-4-propyl-1,3,2-dioxaphospholane,
2-o-tolyl-1,3,2-dioxaphospholane,
2-p-tolyl-4-methyl-1,3,2-dioxaphospholane,
2-p-chlorophenyl-1,3,2-dioxaphospholane,
2-phenyl-1,3,2-dioxaphosphorinane,
hexylene benzenephosphonite (2-phenyl-4,4,6-trimethyl-1,3,2-dioxaphosphorinane),
1,3-butylene benzenephosphonite (2-phenyl-4-methyl-1,3,2-dioxaphosphorinane),
neopentylene benzenephosphonite (2-phenyl-5,5-dimethyl-1,3,2-dioxaphosphorinane),
neohexylene benzenephosphonite (2-phenyl-5-methyl-5-ethyl-1,3,2-dioxaphosphorinane),
2-phenyl-4-propyl-5-ethyl-1,3,2-dioxaphosphorinane,
2-phenyl-4,6-dimethyl-1,3,2-dioxaphosphorinane,
2-phenyl-4-methyl-6-propyl-1,3,2-dioxaphosphorinane,
2-phenyl-5,5-diethyl-1,3,2-dioxaphosphorinane,
2-phenyl-5-ethyl-5-butyl-1,3,2-dioxaphosphorinane,
neopentylene 2-methylbenzenephosphonite,
neopentylene 3-methylbenzenephosphonite,
hexylene 4-methylbenzenephosphonite,
neopentylene 2-chlorobenzenephosphonite and
neopentylene 2,4-dimethylbenzenephosphonite.

The new compounds of the present invention are useful as flame retardant agents, as antioxidants for polyolefins, e.g. polyethylene and polypropylene, as stabilizers for polyurethanes, as stabilizers and curing agents for epoxy resins and to increase the effectiveness of phenolic antioxidants, e.g. in stabilizing polypropylene.

Unless otherwise indicated all parts are by weight.

*Example 1*

Diphenyl benzenephosphonite __ 294 grams (1.0 mol).
Isodecyl alcohol _____ 160 grams (1.01 mols).
Diphenyl phosphite _____ 0.8 gram (0.28% of the diphenyl benzenephosphonite).

This mixture was heated at 110–120° C. for 30 minutes. The phenol formed was then distilled at 10–15 mm. until one mol had been collected. The phenyl isodecyl benzenephosphonite was left in the reaction pot and after filtration was obtained as a colorless liquid in near quantitative yield.

*Example 2*

Example 1 was repeated replacing the 160 grams of isodecyl alcohol by 319 grams of isodecyl alcohol (2.01 mols). The distillation was continued at 10–15 mm. unti two mols of phenol had been removed. Then the diisodecyl benzenephosphonite was recovered from the pot as a colorless liquid in substantially quantitative yield.

*Example 3*

Example 2 was repeated but the disphenyl phosphite was replaced by 0.8 gram of diisodecyl phosphite and the diisodecyl benzenephosphonite were recovered from the pot in substantially quantitative yield.

*Example 4*

Example 2 was repeated but the isodecyl alcohol was replaced by two mols of octadecyl alcohol. The di-octadecyl benzenephosphonite formed was recovered from the pot in excellent yields.

*Example 5*

Diphenyl benzenephosphonite _____mols__ 1
Tetrahydrofurfuryl alcohol _____do____ 1
Diphenyl phosphite _____grams__ 1

The procedure of Example 1 was repeated and phenyl tetrahydrofurfuryl benzenephosphonite was recovered as the final product.

*Example 6*

Diphenyl benzenephosphonite _____mols__ 1
Tetrahydrofurfuryl alcohol _____do____ 2
Diphenyl phosphite _____grams__ 1

The procedure of Example 2 was followed and ditetrahydrofurfuryl benzenephosphonite was recovered as the final product.

*Example 7*

Phenyl isodecyl benzenephosphonite _____mols__ 1
Tetrahydrofurfuryl alcohol _____do____ 1
Di-isodecyl phosphite _____grams__ 1

The procedure of Example 1 was followed and isodecyl tetrahydrofurfuryl benzenephosphonite was recovered as the final product.

*Example 8*

Diphenyl benzenephosphonite _____mols__ 1
Stearyl alcohol _____do____ 1
Tetrahydrofurfuryl alcohol _____do____ 1
Diphenyl phosphite _____grams__ 1

This mixture was heated to 110–120° C. for 30 minutes and then two mols of phenol formed by the transesterification was removed by distillation at 10–15 mm. The stearyl tetrahydrofurfuryl benzenephosphonite was recovered from the pot in excellent yields.

*Example 9*

Diphenyl benzenephosphonite _____mols__ 1
Butyl Carbitol (butoxyethoxyethanol) _____do____ 2
Diphenyl phosphite _____grams__ 1

The procedure of Example 8 was followed and dibutyl Carbitol benzenephosphonite was recovered as the final product.

Example 10

Diphenyl benzenephosphonite _____ mols__ 1
Methoxy Carbowax 350 _____ do____ 2
Diphenyl phosphite _____ grams__ 1

The process of Example 8 was repeated and dimethoxy Carbowax 350 benzenephosphonite was recovered as the final product.

Example 11

Diphenyl benzenephosphonite _____ mols__ 1
Methoxyethanol _____ do____ 1
Diphenyl phosphite _____ grams__ 1

The procedure of Example 1 was repeated and phenyl methoxyethyl benzenephosphonite was recovered as the final product.

Example 12

Diphenyl benzenephosphonite _____ mols__ 1
Methoxyethoxyethoxyethanol _____ do____ 2
Diphenyl phosphite _____ grams__ 1

The procedure of Example 8 was repeated and dimethoxyethoxyethoxyethyl benzenephosphonite was recovered as the final product.

Example 13

Phenyl isodecyl benzenephosphonite _____ mols__ 1
Methoxyethoxyethanol _____ do____ 1
Diphenyl phosphite _____ do____ 1

The process of Example 1 was repeated and isodecyl methoxyethoxyethyl benzenephosphonite was recovered as the final product.

Example 14

Diphenyl benzenephosphonite _____ mols__ 2
Pentaerythritol _____ do____ 1
Diphenyl phosphite _____ grams__ 1.6

This mixture was heated to 110–120° C. for 30 minutes and then four mols of phenol formed by the transesterification was removed by distillation at 10–15 mm. The 3,9-diphenyl-2,4,8,10-tetraoxa-3,9-diphosphaspiro[5,5] undecane was recovered from the pot in excellent yields.

Example 15

Example 14 was repeated replacing the diphenyl benzenephosphite by two mols of di-o-cresyl-2-methylbenzenephosphonite and 3,9-di-2'-methylphenyl-2,4,8,10-tetraoxa-3,9-diphosphaspiro-[5,5]-undecane was recovered from the pot in excellent yields.

Example 16

Diphenyl benzenephosphonite _____ mols__ 1
Ethylene glycol _____ do____ 1
Diphenyl phosphite _____ grams__ 1

This mixture was heated to 110–120° C. and then distillation was begun at 10–15 mm. pressure. The distillation was continued until two mols of phenol were collected. The ethylene benzenephosphonite[2-phenyl-1,3,2-dioxaphospholane] was left in the reaction pot and after filtration was obtained in excellent yield.

Example 17

The process of Example 16 was repeated replacing the diphenyl benzenephosphonite by one mol of didecyl benzenephosphonite and replacing the diphenyl phosphite by 1 gram of didecyl phosphite. The ethylene benzenephosphonite was recovered in equally good yield.

Example 18

Diphenyl benzenephosphonite _____ mols__ 1
Propylene glycol _____ do____ 1
Diphenyl phosphite _____ grams__ 1

The procedure of Example 16 was repeated and propylene benzenephosphonite (2-phenyl-4-methyl-1,3,2-dioxaphospholane) was recovered as the final product.

Example 19

Diphenyl benzenephosphonite _____ mols__ 1
Pinacol _____ do____ 1
Dilauryl phosphite _____ grams__ 1

The process of Example 16 was repeated and 2-phenyl-4,4,5,5-tetramethyl-1,3,2-dioxaphospholane was recovered as the final product.

Example 20

Di-o-cresyl 2-methylbenzenephosphonite _____ mols__ 1
1,2-pentanediol _____ do____ 1
Diisodecyl phosphite _____ grams__ 1

The process of Example 16 was repeated and 2-o-methylphenyl-4-propyl-1,3,2-dioxaphospholane was recovered as the final product.

Example 21

Diphenyl benzenephosphonite _____ mols__ 1
Neopentyl glycol _____ do____ 1
Diphenyl phosphite _____ grams__ 1

This mixture was heated to 110–120° C. for 30 minutes and then distillation was begun at 10–15 mm. pressure. This distillation was continued until two mols of phenol were collected. The neopentylene benzenephosphonite (2-phenyl-5,5-dimethyl-1,3,2-dioxaphosphorinane) was left in the reaction pot and after filtration was recovered as a low melting solid in 95% yield.

Example 22

The process of Example 21 was repeated replacing the diphenyl phosphite by 1 gram of diisodecyl phosphite. The neopentylene benzenephosphonite was recovered in equally good yield.

Example 23

Didecyl benzenephosphonite _____ mol__ 1
Trimethylene glycol _____ do____ 1
Distearyl phosphite _____ gram__ 1

The process of Example 21 was repeated and 2-phenyl-1,3,2-dioxaphosphorinane and was recovered as the final product.

Example 24

Diphenyl benzenephosphonite _____ mol__ 1
Hexylene glycol (2-methyl-2,4-pentanediol) ___ do____ 1
Diphenyl phosphite _____ gram__ 1

The process of Example 21 was repeated and hexylene benzenephosphonite (2-phenyl-4,4,6-trimethyl-1,3,2-dioxaphosphorinane) was recovered as the final product.

Example 25

Diphenyl benzenephosphonite _____ mol__ 1
1,3-butylene glycol _____ do____ 1
Diphenyl phosphite _____ gram__ 1

The process of Example 21 was repeated and 1,3-butylene benzenephosphonite (2-phenyl-4-methyl-1,3,2-dioxaphosphorinane) recovered as the final product.

Example 26

Diphenyl benzenephosphonite _____ mol__ 1
Neohexylene glycol _____ do____ 1
Diphenyl phosphite _____ gram__ 1

The process of Example 21 was repeated and neohexylene benzenephosphonite (2-phenyl-5-methyl-5-ethyl-1,3,2-dioxaphosphorinane) was recovered as the final product.

Example 27

Di-p-cresyl 2-methylbenzenephosphonite _____ mol__ 1
Neopentyl glycol _____ do____ 1
Di-o-cresyl phosphite _____ gram__ 1

The process of Example 21 was repeated and neopentylene-2-methylbenzenephosphonite recovered as the final product.

What is claimed is:
1. A compound having the formula

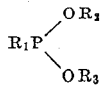

where $R_1$ is selected from the group consisting of phenyl, halophenyl and alkylphenyl, $R_2$ is tetrahydrofurfuryl and $R_3$ is selected from the group consisting of phenyl, halophenyl, alkylphenyl, alkyl and tetrahydrofurfuryl.

2. Ditetrahydrofurfuryl phenylphosphonite.
3. Tetrahydrofurfuryl phenyl phenylphosphonite.
4. Tetrahydrofurfuryl alkyl phenylphosphonites wherein the alkyl group has 10–18 carbon atoms.
5. A compound having the formula

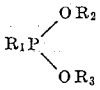

where $R_1$ is selected from the group consisting of phenyl, halophenyl and alkylphenyl, $R_2$ is selected from the group consisting of aryloxyethyl, and alkoxy $(C_2H_4O)_x$ ethyl where X is an integer of at least one and $R_3$ is selected from the group consisting of $R_1$, $R_2$ and alkyl.

6.

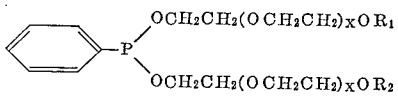

where $R_1$ and $R_2$ are lower alkyl and X is an integer of at least one.

7.

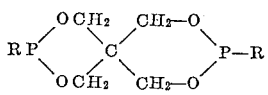

where R is selected from the group consisting of phenyl, alkylphenyl and halophenyl.

8. 3,9 - diphenyl - 2,4,8,10-tetraoxa-3,9-diphosphaspiro [5,5]undecane.

9.

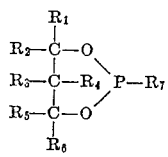

where $R_1$, $R_2$, $R_3$, $R_4$, $R_5$ and $R_6$ are selected from the group consisting of hydrogen and lower alkyl and $R_7$ is selected from the group consisting of phenyl, alkylphenyl and halophenyl.

10. A compound of the formula

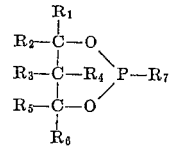

where $R_1$, $R_2$, $R_3$, $R_4$, $R_5$ and $R_6$ are each a member of the group consisting of hydrogen and lower alkyl and $R_7$ is a member of the group consisting of phenyl and tolyl.

11. 2-phenyl-1,3,2-dioxaphosphorinane having up to three lower alkyl groups attached to carbon atoms of the dioxaphosphorinane ring.

12. A compound according to claim 11 which is neopentylene benzenephosphonite.

13. A compound according to claim 11 which is 1,3-butylene benzenephosphonite.

14. A compound according to claim 11 which is 2-phenyl-4,4,6-trimethyl-1,3,2-dioxaphosphorinane.

15. A compound according to claim 11 which is neohexylene benzenephosphonite.

References Cited by the Examiner
UNITED STATES PATENTS

| | | | |
|---|---|---|---|
| 2,234,379 | 3/1941 | Martin | 260—461.308 |
| 2,326,140 | 8/1943 | Gzemski | 260—461.315 |
| 2,769,743 | 11/1956 | Mattson et al. | 260—461.308 |
| 2,841,608 | 7/1958 | Hechenbleikner et al. | 260—461.315 |
| 2,847,443 | 8/1958 | Hechenbleikner et al. | 260—461.315 |
| 2,860,155 | 11/1958 | Walsh | 260—461.308 |
| 2,867,646 | 1/1959 | Whetstone | 260—461.308 |
| 2,903,475 | 9/1959 | Horowitz | 260—461.308 |
| 2,907,787 | 10/1959 | Hoffmann et al. | 260—982 |
| 2,970,166 | 1/1961 | Rosin | 260—461.315 |
| 3,009,939 | 11/1961 | Friedman | 260—461.315 |
| 3,031,489 | 8/1962 | Birum | 260—461.304 |

OTHER REFERENCES

Hoffmann et al.: J. Am. Chem. Soc., vol. 78, Nov. 20, 1956, pp. 5817–5822.

Landauer et al.: J. Chem. Soc., 1953, pp. 2224, 2234.

CHARLES B. PARKER, *Primary Examiner.*

H. J. LIDOFF, LEWIS GOTTS, JOSEPH P. BRUST, *Examiners.*

H. JILES, J. R. GENTRY, F. M. SIKORA, R. L. RAYMOND, *Assistant Examiners.*